(12) United States Patent
Lee et al.

(10) Patent No.: US 6,229,672 B1
(45) Date of Patent: *May 8, 2001

(54) HIGH GRAM LOAD AIR BEARING GEOMETRY FOR A TRIPAD SLIDER

(75) Inventors: Christopher A. Lee, Pleasanton; Ciuter Chang, Fremont; Pablo G. Levi, San Jose; Pravin P. Prabhu, Morgan Hill; Manuel Anaya-Dufresne, Fremont, all of CA (US)

(73) Assignee: Read-Rite Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,137

(22) Filed: Oct. 19, 1998

(51) Int. Cl.⁷ ..................................................... G11B 5/60
(52) U.S. Cl. ........................................................ 360/236.8
(58) Field of Search ................................ 360/103, 246.2, 360/236.5, 236.7, 235.6, 235.7, 235.9, 236, 236.4, 235.8, 236.2, 236.3, 236.9, 236.6, 236.1, 236.8, 237, 237.1

(56) References Cited

U.S. PATENT DOCUMENTS

| 5,299,079 | * | 3/1994 | Kuroda et al. ........................ 360/103 |
| 5,675,453 | * | 10/1997 | Matsuzawa et al. ................. 360/103 |
| 5,739,981 | * | 4/1998 | Cha et al. ............................. 360/103 |
| 5,754,367 | * | 5/1998 | Chang et al. ........................ 360/103 |
| 5,761,003 | * | 6/1998 | Sato .................................... 360/236.8 |
| 5,796,551 | * | 8/1998 | Samuelson ......................... 360/236.8 |
| 5,870,250 | * | 2/1999 | Bolasna et al. .................... 360/236.8 |
| 5,889,637 | * | 3/1999 | Chang et al. ...................... 360/236.8 |
| 5,910,864 | * | 6/1999 | Hira et al. ............................. 360/103 |
| 5,923,499 | * | 7/1999 | Hagen .................................. 360/103 |
| 5,995,324 | * | 11/1999 | Haddock et al. ................. 360/234.7 |
| 6,034,842 | | 3/2000 | Cha .................................... 360/235.6 |
| 6,055,129 | * | 4/2000 | Park et al. ......................... 360/236.1 |
| 6,057,983 | * | 5/2000 | Kajitani ............................. 360/235.6 |
| 6,069,769 | * | 5/2000 | Dorius et al. ..................... 360/235.6 |
| 6,069,770 | * | 5/2000 | Cui et al. ............................ 510/175 |
| 6,115,329 | * | 9/2000 | Hu ......................................... 369/13 |
| 6,130,808 | * | 10/2000 | Yotsuya ............................. 360/235.4 |
| 6,134,083 | * | 10/2000 | Warmka ............................. 360/235.6 |
| 6,157,518 | * | 12/2000 | Koishi et al. ..................... 360/235.8 |

* cited by examiner

*Primary Examiner*—Jefferson Evans
*Assistant Examiner*—Franklin D. Altman, III
(74) *Attorney, Agent, or Firm*—Nathan N Kallman

(57) ABSTRACT

An air bearing slider for a magnetic head is defined by a leading edge and a trailing edge and has a central longitudinal axis extending from the leading edge to the trailing edge. A pair of side pads, and a center pad between the side pads that is disposed substantially on the center axis, are formed on the air bearing surface of the slider. A first central recess having a T-shaped configuration is etched to a first depth, preferably in the range of 5–30 micro-inches with reference to the air bearing surface. A second major recess portion is etched to a second depth in the range of 60–150 micro-inches. The air bearing surface is configured for high load applications and maintains a flat flying height profile. The configured slider is particularly useful with small size sliders, such as picosliders.

6 Claims, 4 Drawing Sheets

HIGH GRAM LOAD AIR BEARING GEOMETRY FOR A TRIPAD SLIDER

CROSS-REFERENCE TO RELATED APPLICATION

Co-pending U.S. application Ser. No. 08/700,759 for "Altitude Insensitive Air Bearing Slider", was filed on Dec. 9, 1996 on behalf of C. Chang et al., and assigned to the same assignee as the present application. The subject matter of that application is related to the present application and is incorporated herein by reference.

FIELD OF THE INVENTION

This invention relates to air bearing sliders for use in rotary disk drives and in particular to the air bearing surface geometry of a slider.

BACKGROUND OF THE INVENTION

Magnetic heads used in disk drives typically incorporate air bearing sliders carrying magnetic transducers that fly over the surface of a magnetic disk for reading and writing data on the disk. The slider is supported by a gimbal connected to a load beam of a head arm suspension assembly. In response to signals from a control unit or computer, the suspension assembly positions the slider over selected tracks of the disk. As the disk rotates it generates an air flow parallel to the tangential velocity of the disk. The air flow provides a lift that allows the slider to fly above the disk. A close spacing or flying height between the transducer and the disk improves the transducing relationship between the magnetic transducer and the magnetic disk. When used with very narrow transducing gaps and very thin magnetic record films, the close spacing allows short wavelength, high frequency signals to be recorded, thereby affording high density, high storage capacity recording.

A major thrust in disk drive design is toward smaller compact drives with smaller components. As a result, head suspensions and head sliders are being reduced in size. The next generation of magnetic disk drives have pico-size sliders, and a planar head air bearing design where usable slider surface area is reduced substantially. A pico-size slider is about 0.049 inches long, about 0.039 inch wide and about 0.012 inch high. A pico-size slider is about 30% of the size of a standard slider. A micro-slider is about 70% of the size of a standard slider and a nano-slider is about 50% of the size of a standard slider.

Hard drives require minimal change in slider flying height over a range of velocity and skew conditions. This requirement is more difficult to satisfy as the load on the air bearing increases, or as the surface area for the air bearing decreases. In high load applications, e.g. where non-operating shock issues are of concern, maintaining a proper flying-height profile for gram loads that are typical of larger nano-size sliders is desirable.

Current designs for pico-size sliders support loads in the 2.0 to 2.5 gram range, and are able to maintain near constant flying heights from the inside diameter to the outside diameter of a disk in a hard drive. However, when the gram load is pushed up to 3.5 grams, the modeled profile delta (pd) increases to 0.2 or 0.3 micro-inches. Profile deltas above 0.1 micro-inches are considered unacceptable. A "profile delta" is the maximum flying height minus the minimum flying height as the slider tracks from the inside radius of the disk to the outside radius of the disk.

An object of the invention is to provide an air bearing design for a reduced size form factor slider that makes the flight attitude of the slider less sensitive to changes in velocity and skew angle.

Another object of this invention is to provide an air bearing surface for a pico-sized slider which flies at near constant height under conditions of changing velocity and skew angle, at relatively high gram loads.

Another object of this invention is to provide an air bearing slider having constant flying height at different radii of a magnetic storage disk.

SUMMARY OF THE INVENTION

According to this invention, an air bearing slider is formed with an air bearing surface (ABS) having three pads or rails encompassed by multiple recess areas. The three pads include a center pad and two side pads. The slider is defined by a leading edge and a trailing edge and has a central longitudinal axis. A first recessed or etched area is configured in a T-shaped form that encompasses the center pad. The leg of the central T-shaped recess extends toward the slider trailing edge. The central T-shaped recess is disposed asymmetrically about the slider central longitudinal axis. A second major recess is formed adjacent to the leg of the central recess of a different depth than the depth of the central T-shaped recess. The second recess area includes the perimeter portions along the leading edge and the side boundaries of the slider. In one implementation, recess areas of a different depth than the major recess are formed on both sides of each of the side pads.

The depth of the T-shaped central recess is relatively shallow, about 5–30 microinches, while the depth of major recess is greater, between 60–150 microinches, by way of example. It should be understood that more than two recesses can be implemented with the novel air bearing design disclosed herein.

The invention has the advantage that by using two recessed areas of different depths and incorporating arbitrary shaping of the three ABS pads, a substantially constant flying height, with variations $\leq 0.1$ microinch over the data zone, can be achieved while supporting a 3.5 gram load in a picoslider form factor. The novel design helps hard disk drive products circumvent the shock/vibration problems generally encountered on picoslider suspensions with a standard 2.5 gram load. The novel air bearing design incorporates a second recess depth to achieve subambient pressure thereby increasing the overall air bearing stiffness of the slider.

DESCRIPTION OF THE DRAWINGS

The invention will be described in greater detail with reference to the drawings in which.

DESCRIPTION OF THE INVENTION

Figure 1:
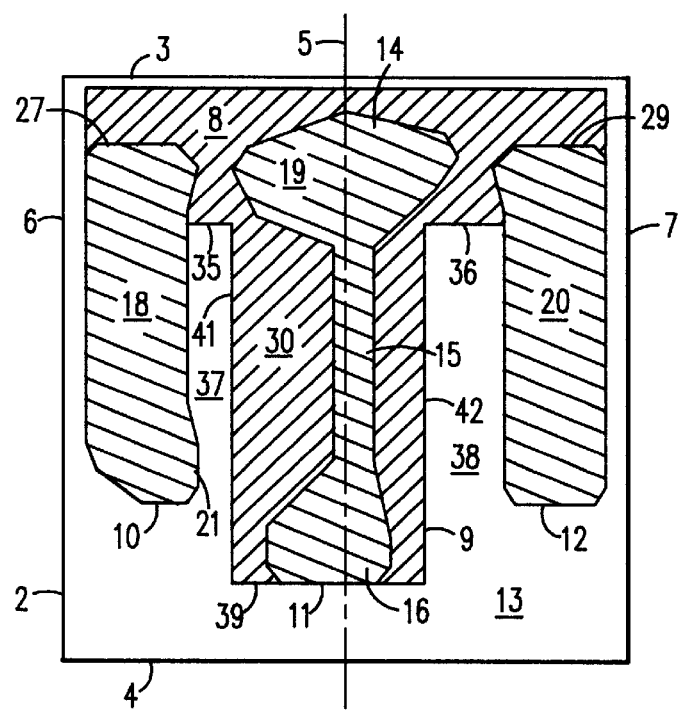
FIG. 1 is a plan view of the air bearing surface (ABS) of a tripad air bearing slider, according to this invention.
Figure 2:
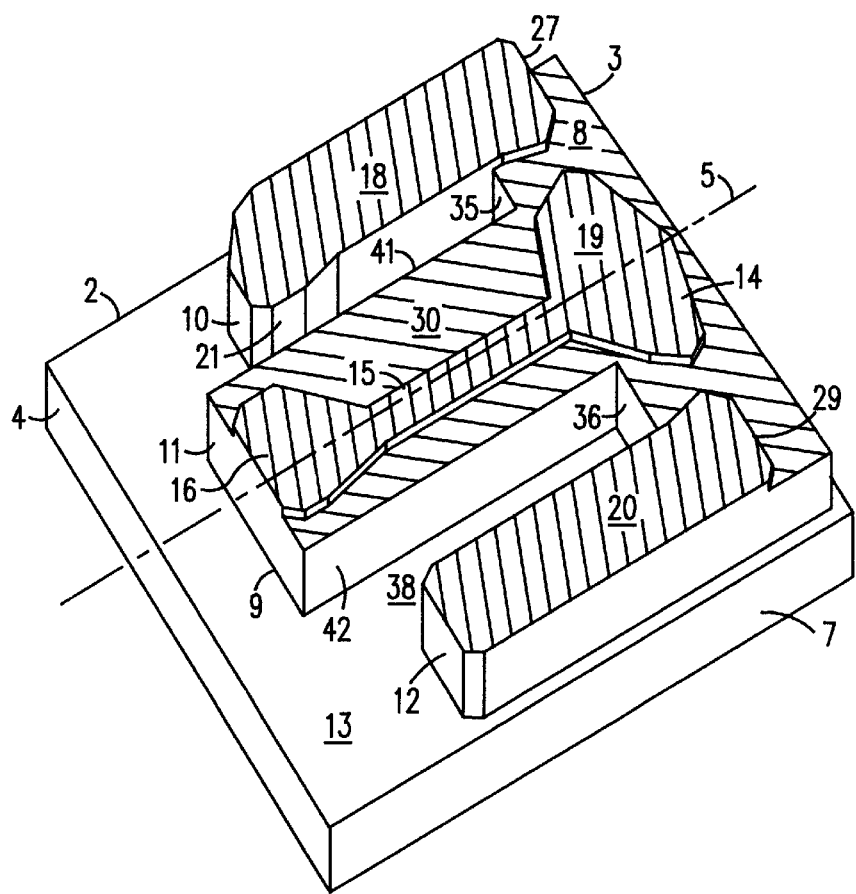
FIG. 2 is a perspective view of the air bearing surface (ABS) of FIG. 1.

With reference to FIGS. 1 and 2, the preferred embodiment of the invention comprises an air bearing surface of a head slider 2 that is configured with side pads 18 and 20 and a center pad 19. Recesses of different depths are formed between the pads by etching or other known techniques.

The magnetic head slider 2 has a leading edge 3 and a trailing edge 4, a central longitudinal axis 5 extending from the leading edge to the trailing edge, and a first side 6 and a second side 7 substantially parallel to the axis 5 and perpendicular to the edges 3 and 4.

An etched central major recess 30 extends partially from a perimeter area at the leading edge 3 towards the trailing edge of the slider. The central major recess 30 is T-shaped having a top lateral head portion 8 and a vertical leg 9 extending from the trailing edges 35, 36 of the top portion 8 part way towards the trailing edge 4 of the slider and terminating at trailing end 39. The T-shaped recess 30 is formed asymmetrically about the central axis 5 between the first and second side pads 18 and 20. The recess 30 surrounds the length of the center pad 19. In this embodiment, the recess 30 is preferably etched to about 20 micro-inches. This relatively shallow T-shaped recess 30 affords increased viscous damping thereby providing improved slider reliability and robustness at the head/disk interface.

A second major recess 13 includes recessed areas 37 and 38 formed between the leg 9 of the T-shaped recess 30 and the side pads 18 and 20 respectively. The major recess 13 extends to the trailing edge 4 of the slider and is formed below the trailing edge 39 of the T-shaped recess 30 and along perimeter sections of the slider sides 6 and 7 and leading edge 3. The second major recess 13 is etched to a depth of about 120 micro-inches. The recesses 13 and 30 provide subambient air pressure to enhance the overall stiffness of the bearing.

The first pad 18 extends from an end 27 at the top portion 8 of the first recess 30 partially towards the trailing edge 4 of the slider and terminates at a trailing end 10. The first pad 18 is mostly rectangular but has angled corners and diverges at the top and bottom portions of the pad and has a bottom protrusion 21 in the direction towards the central axis 5.

The second pad 20 extends from an end 29 at the top portion 8 of the first recess 30 partially towards the trailing edge 4 of the slider and terminates at a trailing end 12. The second pad 20 is mostly rectangular and has slightly angled corners with a small protrusion at its top portion in the direction towards the central axis 5.

The center pad 19 is located along the central axis 5 within the T-shaped recess 30. The third pad 19 includes a polygon-shaped top portion 14, a middle narrow rectangular waist portion 15, and a bottom foot portion 16. It should be understood that at least one transducer is provided at the trailing edge of the slider for writing and reading data signals on a magnetic disk.

The recessed area 37 is bounded by the first pad 18, the side 41 of the leg 9 of the T-shaped recess 30 and the edge 35 of the top portion 8 of the recess 30. The second recessed area 38 is bounded by the second pad 20, the side 42 of the recess 30 and the lower edge 36 of the top portion 8 of the recess 30.

In accordance with this invention, the depth of the major recess 13, which includes recessed areas 37 and 38, is optimized to achieve insensitivity to changes in altitude, rotational speed variations and to track seek position. Preferably, the major recess 13 is etched to a depth with reference to the ABS that is a multiple of the depth of the T-shaped recess 30. In such case, the depth of the major recess 13 is approximately 120 micro-inches or six times the depth of the recess 30.

Figure 3:
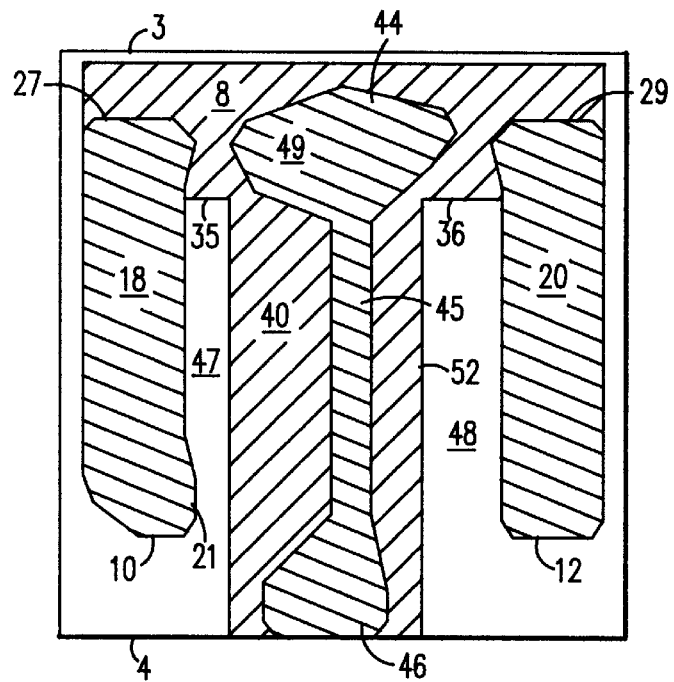
FIG. 3 is a plan view of an alternative embodiment of the invention.

FIG. 3 illustrates an ABS geometry somewhat similar to that shown in FIGS. 1 and 2, except that the center pad 44 extends entirely to the trailing edge 4 of the slider. The center pad 44 is formed with a polygon-shaped top portion 49, a narrow rectangular middle waist portion 45, and a flared portion 46 that terminates at the trailing edge of the slider. The major recess includes recessed regions 47 and 48 that are adjacent to the center pad 44 and which extend respectively from the trailing edges 35 and 36 of the top recess portion 8 to the trailing edge of the slider. The recessed regions 47 and 48 are disposed between the leg 52 of the T-shaped recess 40 and side pads 18 and 20 respectively. In the embodiment of FIG. 3, the etched recess 40 extends completely to the trailing edge 4 of the slider.

Figure 4:
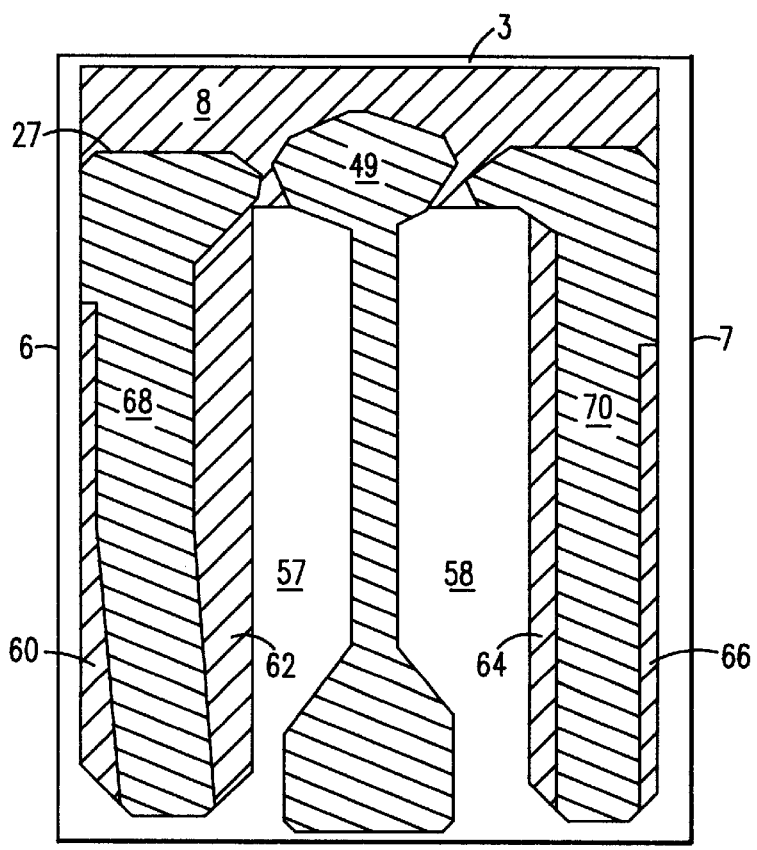
FIG. 4 is a plan view of another embodiment of the invention.

FIG. 4 depicts another embodiment of the invention wherein the leg of the central recess is eliminated, leaving the head portion 8. Four etched recess areas 60, 62, 64, 66 are added in lieu of the leg 52 of the central recess 40. Inner recesses 62 and 64 are disposed between the recess areas 57 and 58 and side pads 68 and 70 respectively. The recesses 60 and 66 are disposed respectively between the side pads 68 and 70 and the sides 6 and 7 of the slider. The recesses 60, 62, 64 and 66 have a different etched depth than the depth of the recess areas 57 and 58.

Figure 5:
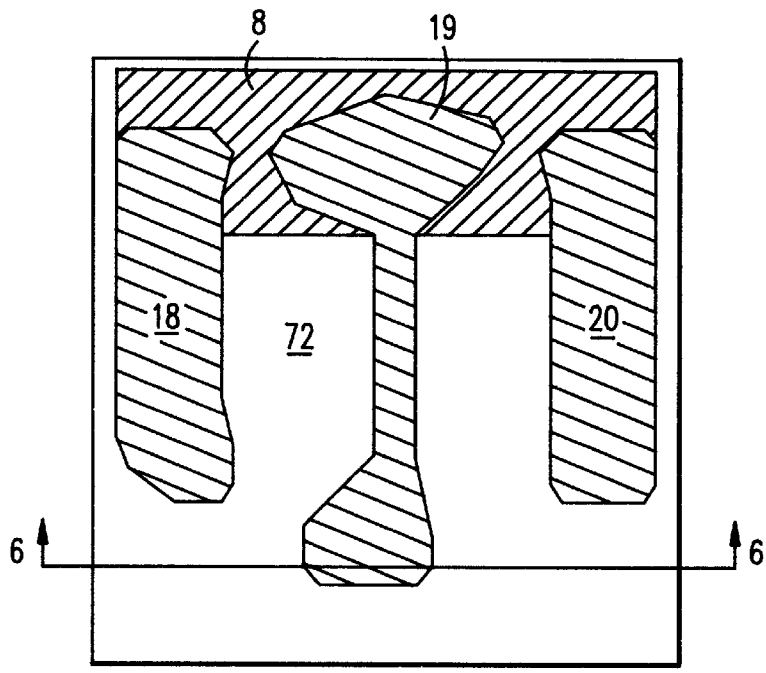
FIG. 5 is a plan view of another embodiment of the invention.

FIG. 5 illustrates an embodiment similar to that shown in FIG. 1, except without the shallow etched leg area 9 of the central recess, but with the shallow etched head recess area 8 remaining. A second major recessed region 72 is formed around the center pad 19, the side pads 18 and 20, and under the shallow etched head portion 8.

Figure 6:
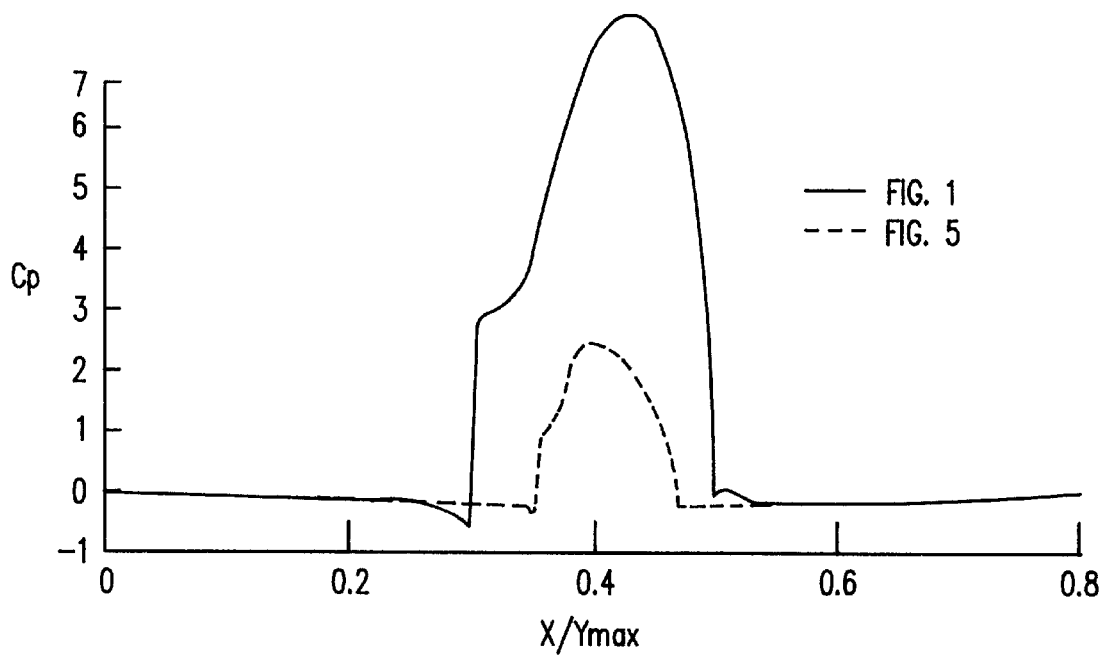
FIG. 6 is a plot of pressure Cp along the cross-sectional line AA of FIG. 5.
Figure 7:
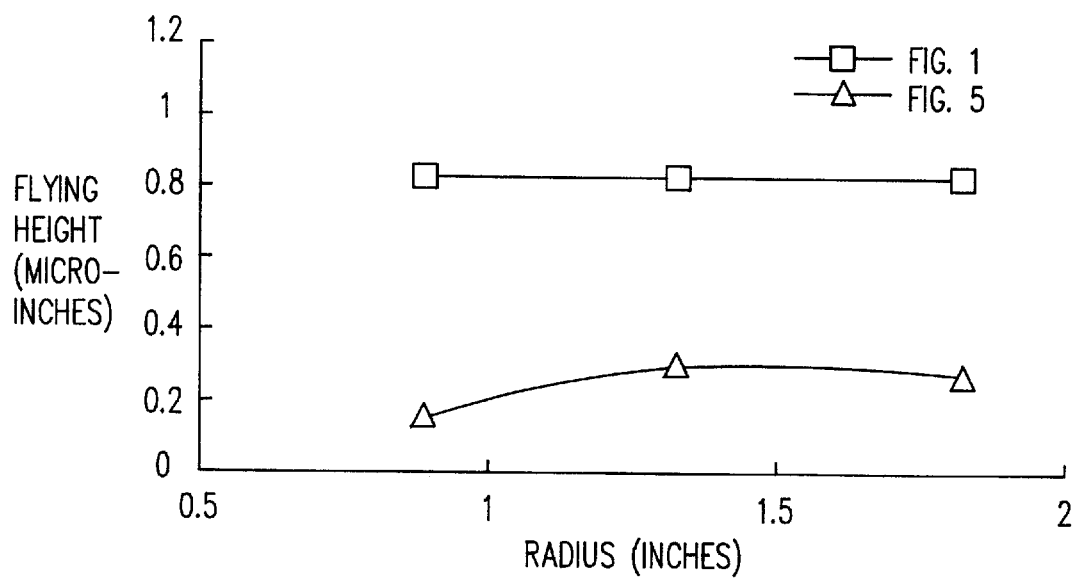
FIG. 7 is a plot of slider flying height versus disk radius for the embodiment of FIG. 5.
Figure 8:
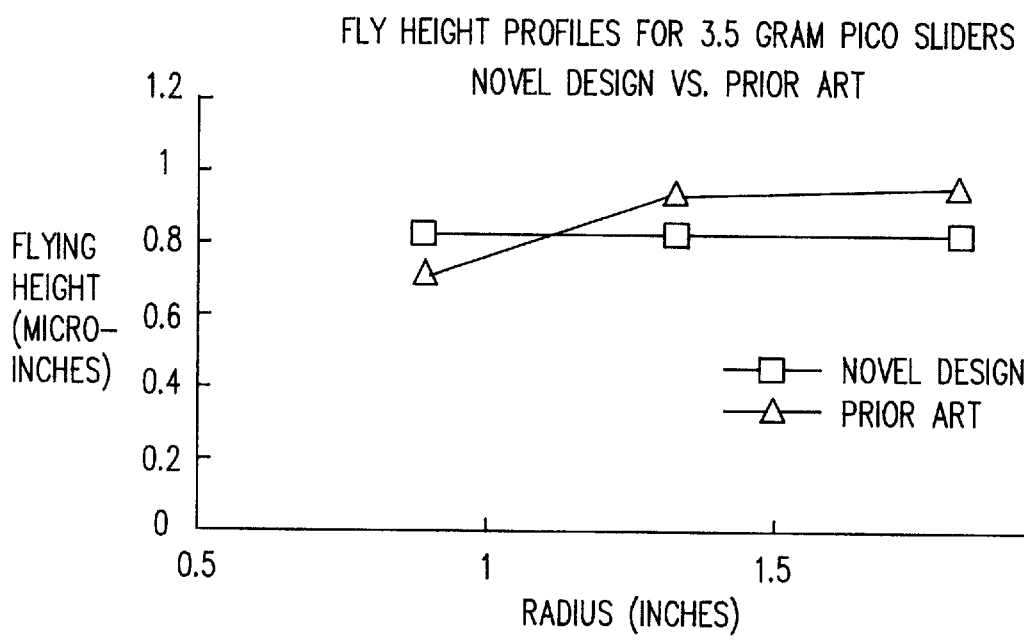
FIG. 8 is a plot of slider flying height versus disk radius comparing the flying height profiles of the present invention with the prior art.

FIG. 6 shows the pressure distribution across the air bearing slider along the cross-section A—A of FIG. 5. FIG. 7 is a plot representing the flying height of the slider relative to the data track radius of the disk, which ranges from 0.5 to 2 inches. FIG. 8 compares the flying height profiles of the novel design of the 3.5 gram load picoslider disclosed herein to prior art air bearing sliders. It should be noted that the flying height remains substantially constant for the slider of this invention, whereas there is significant deviation of flying height for prior art sliders of this type.

There has been disclosed herein an air bearing slider having an advantage in that the T-shaped recess with a shallow depth enhances pressurization due to the compression of the air flow as it enters around the slider leading edge. This results in increased stiffness in the pitch direction thereby greatly reducing the flying height excursions and sensitivity to static pitch bias and taper length. One of the most desirable features of the present invention is the achievement of a substantially constant flying height of the slider at different radial positions of the slider relative to the disk.

Another feature is that the novel design provides a flight attitude of the slider that is less sensitive to changes in disk velocity and slider skew angle in a reduced size slider form factor. Also the depth of the second recess can result in subambient pressure, thereby increasing the overall air bearing stiffness of the slider. Furthermore, recesses having multiple depths can be used to optimize air bearing stiffness. A further advantage of this invention is that the shallow T-shaped recess will realize increased viscous damping, thereby resulting in improved slider reliability and robustness at the head/disk interface.

It should be understood that the scope of the invention is not limited to the specific configuration, parameters or dimensions set forth above. For example, the etch depths may vary according to the application and size of the slider and recesses of multiple depths can be used to optimize the air bearing stiffness. While the central pad has polygon-shaped sections, other geometries may be used for specific applications.

What is claimed is:

1. A magnetic head air bearing slider having an air bearing surface, a first side and a second side substantially parallel to said first side, a leading edge and a trailing edge extending between said first and second sides, a central longitudinal axis extending from said leading edge to said trailing edge, comprising:

a center pad extending towards said trailing edge, said center pad formed with a polygon-shaped top portion, a middle narrow rectangular waist portion, and a bottom foot portion, said center pad being asymmetrical with reference to said central longitudinal axis, said waist portion being between said top portion and said bottom foot portion, all of said portions being asymmetrical relative to said central longitudinal axis, and wherein said top portion is closer to said leading edge than said waist portion and said bottom foot portion;

first and second side pads extending towards said trailing edge;

said center pad and said side pads defining the air bearing surface;

a T-shaped recess region abutting said center pad and extending from said bottom foot portion to said leading edge thereby entirely encompassing said center pad, said T-shaped recess region having a lateral portion at the leading edge extending continuously from said first side to said second side, said T-shaped region being etched to a first depth relative to said air bearing surface;

a major recess region formed between said T-shaped region and said side pads and extending to said trailing edge, said major recess region being etched to a second depth relative to said air bearing surface, said second depth being greater than said first depth.

2. An air bearing slider as in claim 1, wherein said first and second pads are mostly rectangular and have angled corners that are not right angles.

3. An air bearing slider as in claim 1 wherein said first depth is in the range of 5–30 micro-inches.

4. An air bearing slider as in claim 1 wherein said second depth is in the range of 60–150 micro-inches.

5. A magnetic head air bearing slider as in claim 1, wherein said center pad extends only partially towards said trailing edge and is spaced from said trailing edge.

6. An air bearing slider as in claim 1, wherein said center pad and said first etched central recess extends continuously to said trailing edge of said slider.

* * * * *